(12) United States Patent
Best

(10) Patent No.: US 7,853,129 B2
(45) Date of Patent: Dec. 14, 2010

(54) INFRARED EMITTING APPARATUS

(75) Inventor: Willie H. Best, Columbia, SC (US)

(73) Assignee: Char-Broil, LLC, Columbus, GA (US)

( * ) Notice: Subject to any disclaimer, the term of this patent is extended or adjusted under 35 U.S.C. 154(b) by 1444 days.

(21) Appl. No.: 11/156,410

(22) Filed: Jun. 20, 2005

(65) Prior Publication Data

US 2006/0021517 A1 Feb. 2, 2006

Related U.S. Application Data

(60) Provisional application No. 60/582,276, filed on Jun. 23, 2004, provisional application No. 60/591,215, filed on Jul. 26, 2004.

(51) Int. Cl.
*F24H 9/00* (2006.01)
(52) U.S. Cl. .......................... 392/432; 392/407; 99/451
(58) Field of Classification Search ........................ None
See application file for complete search history.

(56) References Cited

U.S. PATENT DOCUMENTS

| | | | |
|---|---|---|---|
| 3,155,814 A | 11/1964 | Appleman et al. | |
| 3,245,458 A | 4/1966 | Patrick et al. | |
| 3,277,948 A | 10/1966 | Best | |
| 3,437,415 A | 4/1969 | Davis et al. | |
| 3,561,902 A | 2/1971 | Best | |
| 3,586,825 A | 6/1971 | Hurley | |
| 3,663,798 A | 5/1972 | Speidel et al. | |
| 3,683,058 A | 8/1972 | Partiot | |
| 3,941,117 A | 3/1976 | Pei et al. | |
| 4,024,839 A | 5/1977 | Reid, Jr. et al. | |
| 4,039,275 A | 8/1977 | McGettrick | |
| 4,057,670 A | 11/1977 | Scheidler | |
| 4,140,100 A | 2/1979 | Ishihara | |
| 4,207,456 A | 6/1980 | Best | |

(Continued)

FOREIGN PATENT DOCUMENTS

DE 102 15 688 A1 11/2003

(Continued)

OTHER PUBLICATIONS

Char-Broil, Assembly Instructions for Models 6320, 6321 & 6323; 1992, pp. 1-18.

(Continued)

*Primary Examiner*—Thor S Campbell
(74) *Attorney, Agent, or Firm*—Fellers, Snider, Blankenship, Bailey & Tippens, P.C.

(57) ABSTRACT

An apparatus for cooking food with infrared radiation includes an infrared energy emitter for emitting the infrared radiation, and a grid in close proximity to the infrared energy emitter. A first side of the grid can be for supporting the food at a position so that at least some of the infrared radiation will cook the food. A second side of the grid can be sufficiently close to the emitting side of the emitter for substantially restricting any airflow in any space between the second side of the grid and the emitting side of the emitter. Partitions of the grid can operatively segregate the emitting side of the emitter into segments, which can provide a substantially uniform distribution of infrared radiation.

47 Claims, 9 Drawing Sheets

U.S. PATENT DOCUMENTS

| | | |
|---|---|---|
| 4,235,023 A | 11/1980 | Best |
| 4,276,869 A | 7/1981 | Kern |
| 4,321,857 A | 3/1982 | Best |
| 4,375,802 A | 3/1983 | Wallasvaara |
| 4,403,541 A | 9/1983 | Berger |
| 4,403,597 A | 9/1983 | Miller |
| 4,426,792 A | 1/1984 | Best |
| 4,437,833 A | 3/1984 | Mertz |
| 4,508,097 A | 4/1985 | Berg |
| 4,546,553 A | 10/1985 | Best |
| 4,569,657 A | 2/1986 | Laspeyres |
| 4,575,616 A | 3/1986 | Bergendal |
| 4,606,261 A | 8/1986 | Bernardi |
| 4,715,356 A | 12/1987 | Reynolds |
| 4,785,552 A | 11/1988 | Best |
| 4,798,192 A | 1/1989 | Maruko |
| 4,839,502 A | 6/1989 | Swanson et al. |
| 4,883,423 A | 11/1989 | Holowczenko |
| 4,886,044 A | 12/1989 | Best |
| 4,909,137 A | 3/1990 | Brugnoli |
| 5,024,209 A | 6/1991 | Schaupert |
| 5,028,760 A | 7/1991 | Okuyama |
| 5,062,408 A | 11/1991 | Smith et al. |
| 5,062,788 A | 11/1991 | Best |
| 5,105,725 A | 4/1992 | Haglund |
| 5,111,803 A | 5/1992 | Barker et al. |
| 4,546,533 A | 4/1993 | Best |
| 5,218,952 A | 6/1993 | Neufeldt |
| 5,230,161 A | 7/1993 | Best |
| 5,240,411 A | 8/1993 | Abalos |
| 5,277,106 A | 1/1994 | Raymer et al. |
| 5,279,277 A | 1/1994 | Barker |
| 5,306,138 A | 4/1994 | Best |
| 5,313,877 A | 5/1994 | Holland |
| 5,363,567 A | 11/1994 | Best |
| 5,488,897 A | 2/1996 | Snyder |
| 5,509,403 A | 4/1996 | Kahlke et al. |
| 5,513,623 A | 5/1996 | Hong |
| 5,566,607 A | 10/1996 | Schleimer |
| 5,567,459 A | 10/1996 | Gonzalez-Hernandez et al. |
| 5,571,009 A | 11/1996 | Stålhane et al. |
| 5,582,094 A | 12/1996 | Peterson et al. |
| 5,594,999 A | 1/1997 | Best |
| 5,676,043 A | 10/1997 | Best |
| 5,711,661 A | 1/1998 | Kushch et al. |
| 5,761,990 A | 6/1998 | Stewart et al. |
| 5,782,166 A | 7/1998 | Lin |
| 5,823,099 A | 10/1998 | Ko |
| 5,890,422 A | 4/1999 | Clark et al. |
| 5,989,013 A | 11/1999 | Gray |
| 6,114,666 A | 9/2000 | Best |
| 6,159,001 A | 12/2000 | Kushch et al. |
| 6,190,162 B1 | 2/2001 | Smith et al. |
| 6,205,996 B1 | 3/2001 | Ryan |
| 6,461,150 B1 | 10/2002 | Sirand |
| 6,779,519 B2 | 8/2004 | Harneit |
| 7,202,447 B2 | 4/2007 | Kingdon et al. |
| 2001/0036610 A1 | 11/2001 | Wood |
| 2002/0020405 A1 | 2/2002 | Coleman et al. |
| 2004/0060552 A1 | 4/2004 | Yamada et al. |
| 2004/0152028 A1 | 8/2004 | Singh et al. |
| 2004/0250688 A1 | 12/2004 | Farkas et al. |
| 2008/0072890 A1 | 3/2008 | Best |
| 2008/0121117 A1 | 5/2008 | Best |

FOREIGN PATENT DOCUMENTS

| | | |
|---|---|---|
| EP | 0 221 686 A1 | 5/1987 |
| EP | 1 028 292 | 8/2000 |
| FR | 1 129 123 | 1/1957 |
| FR | 1 204 968 | 1/1960 |
| FR | 1 387 132 | 1/1965 |
| FR | 2 076 610 | 10/1971 |
| FR | 2 472 141 | 6/1981 |
| GB | 23552 | 0/1915 |
| GB | 432 481 | 7/1935 |
| GB | 562 136 | 6/1944 |
| GB | 576 377 | 4/1946 |
| GB | 1 339 345 | 12/1973 |
| WO | WO 2004/103133 | 12/2004 |
| WO | WO 2008/125258 | 10/2008 |

OTHER PUBLICATIONS

International Preliminary Report on Patentability from corresponding International Application No. PCT/US2005/021628.

U.S. Appl. No. 11/156,790, filed Jun. 20, 2005; in re: Willie H. Best., entitled *Radiant Burner*.

Cross Section of G3000 Cabinet Unit; Sep. 4, 2001; Thermal Engineering Corp., Columbia, South Carolina.

Cross Section of G-Series Burner System; Sep. 4, 2001; Thermal Engineering Corp., Columbia, South Carolina.

"Application of far infra-red radiation to cooking of meat products", Sheridan P., et al., Journal of Food Engineering (1999), vol. 41, pp. 203-208.

"Analysis of yield while cooking beefburger patties using far infrared radiation", Sheridan P., et al., Journal of Food Engineering (2002), vol. 51, No. 1, pp. 3-11.

"Modeling of heat transfer and evaporative mass losses during the cooking of beef patties using far-infrared radiation", Shilton N., Journal of Food Engineering (2002), vol. 55, No. 3, pp. 217-222 (Abstract Only).

"Determination of the thermal diffusivity of ground beef patties under infrared radiation oven-shelf cooking", Shilton, N., Journal of Food Engineering (Mar. 2002), vol. 52, No. 1, pp. 39-45 (Abstract Only).

"Impact of IR broiling on the thiamin and riboflavin retention and sensory quality of salmon steaks for foodservice use", Takahashi, Y., Journal of Food Engineering (1987), vol. 52, No. 1, pp. 4-6 (Abstract Only).

"Application of far infra-red radiation to cooking of meat products", Sheridan P., Journal of Food Engineering (1999), vol. 41, No. 3/4, pp. 203-208 (Abstract Only).

INFRARED EMITTING APPARATUS

CROSS-REFERENCE TO RELATED APPLICATIONS

The present application claims the benefit of both U.S. Provisional Application No. 60/582,276, filed Jun. 23, 2004, and U.S. Provisional Application No. 60/591,215, filed Jul. 26, 2004. Each of the above-referenced provisional applications is incorporated herein by reference, in its entirety. Also incorporated herein by reference, in its entirety, is the U.S. utility patent application that is entitled "Radiant Burner," names Willie H. Best as the inventor, and has been filed on the same day as the present application.

TECHNICAL FIELD

The present invention relates to infrared radiant energy emitters and, more particularly, to infrared radiant energy emitters used with gas-fired infrared burners and/or gratings for cooking food.

BACKGROUND OF THE INVENTION

There are various types of gas grills or broilers on the market sold under a variety of brand names. The majority of these grills use a conventional port type gas burner that is manufactured in various configurations so that the products of combustion from the burning of the gas-air mixture provide the energy for cooking the food. In these types of grills, the heat transfer to the food is mostly by convection (hot air). Usually in these types of convective heat transfer grills, the burners are protected from liquids expelled from the food during the cooking process by some type of ceramic or metal covers placed over the burners. These covers or shields are heated to a level that will vaporize the juices expelled from the food during cooking. The vapors then pass over the food imparting a smoky flavor, sometimes referred to as an outdoor or "charbroiled" flavor. Some grill producers refer to these covers or shields as flavor-producing bars. In some publications and advertising, some of these types of grills are referred to as "radiant," but in most instances, the amount of infrared radiant energy produced by a grill that does not employ a radiant type burner is negligible compared to the convective energy.

Another type of grill employs an infrared energy producing burner. A typical grill of this type is disclosed in U.S. Pat. Nos. 4,321,857 and 4,886,044 to Best. When the burner surface is open to the grids that support the food, the food is cooked with about one-half of the energy in the form of infrared radiant energy and the rest of the energy transferred to the food is in the form of convective heat. This type of infrared burner is described in U.S. Pat. Nos. 3,277,948 and 3,561,902 to Best. The third type of gas grill, described by U.S. Pat. No. 6,114,666 to Best, transfers all of the energy to the food in the form of infrared radiant energy. In this type of grill, the convective energy (products of combustion) from the combustion of the fuel-air mix is directed away from the food and is discharged without coming in contact with the food. In this type of gas grill, the food is broiled because it is cooked only by radiant energy.

One problem common to the prior art types of grills is flare-ups. When cooking, most flare-ups (uncontrolled burning) are caused when oils, discharged from the fat in the meat being cooked, ignite. The source of ignition for the oils is a hot surface or open flame with which the oils come in contact. The surface on which the oils fall is usually above the ignition temperature of the oils. In the early cycle of the cooking process, it is common practice to sear the meat, which requires high fire. On high fire, there is typically a source of ignition for these oils. Therefore, it is difficult to cook or broil meat containing fat fast enough to sear and mark the meat properly without causing flare-ups (causing excessive charring).

Flare-ups can be prevented by maintaining all surfaces of the grills with which the oils can come in contact at a temperature that is lower than the ignition temperature of the oils. However, these types of grills are designed for very slow cooking and are not usually used for cooking a variety of meat cuts such as steak, hamburgers, pork chops, and lamb chops. Also, these types of slow cooking grills are seldom used in commercial applications. Various marketing studies have shown that the primary use of consumer and commercial type grills is for cooking cuts of meat that are normally cooked or broiled relatively fast. For example, the time to cook or broil a 1 inch thick steak would be between 6 to 14 minutes, depending on how well done one likes a steak. A ⅓ pound hamburger should cook to a 160° F. center in less than 8 minutes. Most grills used in commercial applications must be capable of cooking or broiling meat relatively fast and to sear and mark the surface within 2 to 4 minutes.

The problems with flare-ups or uncontrolled burning are especially bothersome in commercial use because of the large quantities of meat being prepared at the same time. The larger cooking surfaces of these types of grills allow for more meat to be cooked or broiled at the same time, expelling more oil from the fat onto the grill creating the potential for large flare-ups. In the cooking of meats such as a 1 inch steak, it is highly desirable to sear and mark the surface quickly (2 to 4 minutes) and to complete the cooking or broiling in less than an additional 6 to 10 minutes. When conventional grills are heated to a level to accomplish the desired cooking times, flare-up becomes a constant problem if the meat contains even a moderate amount of fat.

Another problem typical of prior art types of grills is that the energy is not distributed uniformly over the cooking grid surface. A report published by Don Fisher of the Food Service Technology Center in San Ramon, Calif., *Commercial Cooking Appliance Technology Assessment*, Report No. 5011.02.26, clearly illustrates the variation in energy levels over the cooking grid surface. This report covers commercial types of grills, but the same problem exists with consumer types of grills. This particular problem with prior art types of grills impedes the cooking or broiling process and requires the chef to redistribute the food over the cooking grids in order to ensure energy absorption uniformity. Therefore, it is often difficult for even experienced chefs to cook or broil multiple pieces of meat to the same level of being done.

While flare-ups and poor heat distribution impose operational problems, typical prior art types of grills are also very inefficient. That is, a small amount of the energy consumed during operation is actually imparted to the food. This problem is discussed in the report mentioned above. The problem is less pronounced in the use of consumer grills because of briefer cooking periods. However, in commercial use this problem is more pronounced because many grills operate in excess of 12 hours each day. It is only logical to consume less energy to achieve the same or better results than it is to waste energy regardless of the application. The grill disclosed by U.S. Pat. No. 6,114,666 to Best has significantly increased the efficiency of gas grills over the prior art and provides the basis for still further improvement.

In the report referred to above published by the Food Service Technology Center, desirable characteristics of an advanced under-fired broiler or grill (to be developed in the future) are listed and include the following: improved uniformity, reduced energy consumption, reduced heat gain to the kitchen, lower emissions, and maintaining the signature "charbroiled" food characteristics. The report does not discuss flare-up as a problem. It is likely that flare-up is considered as a necessary evil of a hot grill. Considering the problems with existing prior art types grills, specifically related to flare-ups and energy distribution over the cooking grid surface, along with excessive energy consumption, it can be seen that a need exists for an improved grill or broiler that provides improvements with regard to one or more of the above-mentioned problems.

BRIEF SUMMARY OF SOME ASPECTS OF THE INVENTION

In accordance with one aspect of the present invention, an apparatus for cooking food with infrared radiation includes at least one infrared energy emitter for emitting at least the infrared radiation, and at least one grid, or the like, in close proximity to the infrared energy emitter. A first side of the grid can be for supporting the food at a position so that at least some of the infrared radiation will cook the food. A second side of the grid can be sufficiently close to the emitting side of the emitter for substantially restricting any airflow in any space between the second side of the grid and the emitting side of the emitter. Such restricting of airflow advantageously seeks to overcome problems associated with flare-up, by restricting the amount of oxygen that is available proximate the emitting side of the emitter. Such restricting of airflow can also advantageously restrict convective cooling of the infrared energy emitter, which can help to keep the temperature of the emitter relatively high and, therefore, enhance the emission of infrared radiation from the emitter.

In accordance with one aspect of the present invention, the grid, or the like, can include partitions that are in a predetermined configuration and adjacent to the emitting side of the emitter so that the emitting side of the emitter is operatively segregated into segments. This segregating into segments can advantageously provide a substantially uniform distribution of infrared radiation. For example, the partitions and the segments can respectively cooperatively define a plurality of cavities or open chambers, or the like. Each of the cavities can include an inner portion and an outer opening, with the outer opening being farther from the emitting side of the emitter than the inner portion of the cavity. For each cavity, substantially all of the energy emitted from the segment of the emitter that at least partially defines the inner portion of the cavity can exit the outer opening of the cavity as radiant energy, which can be advantageous.

Other aspects and advantages of the present invention will become apparent from the following.

BRIEF DESCRIPTION OF THE DRAWINGS

Having described some aspect of the invention in general terms, reference will now be made to the accompanying drawings, which are not necessarily drawn to scale, and wherein.

DETAILED DESCRIPTION OF EXEMPLARY EMBODIMENTS

Figure 1:
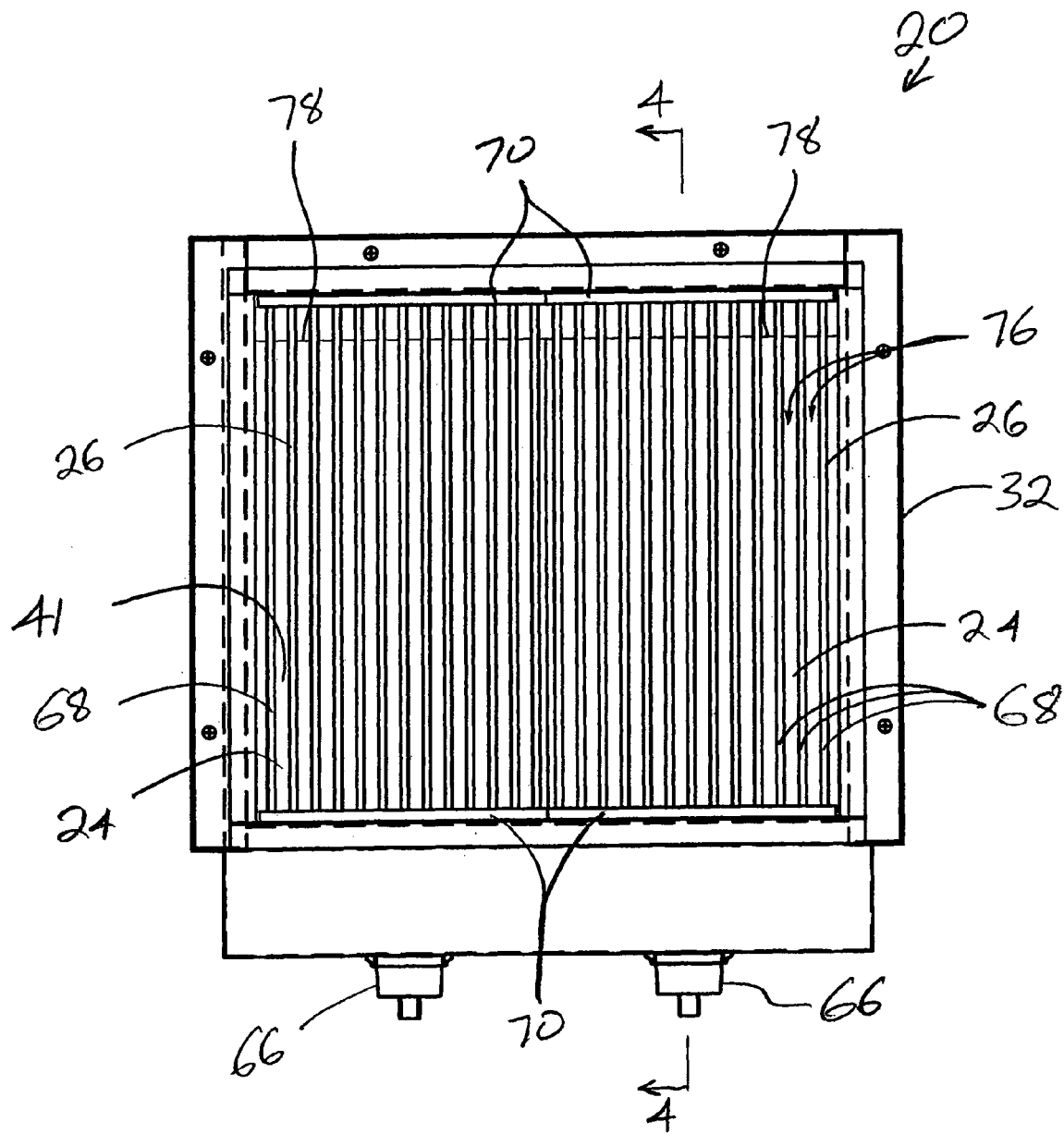
FIG. 1 is a schematic, top plan view of a cooking apparatus in accordance with an exemplary embodiment of the present invention.
Figure 2:
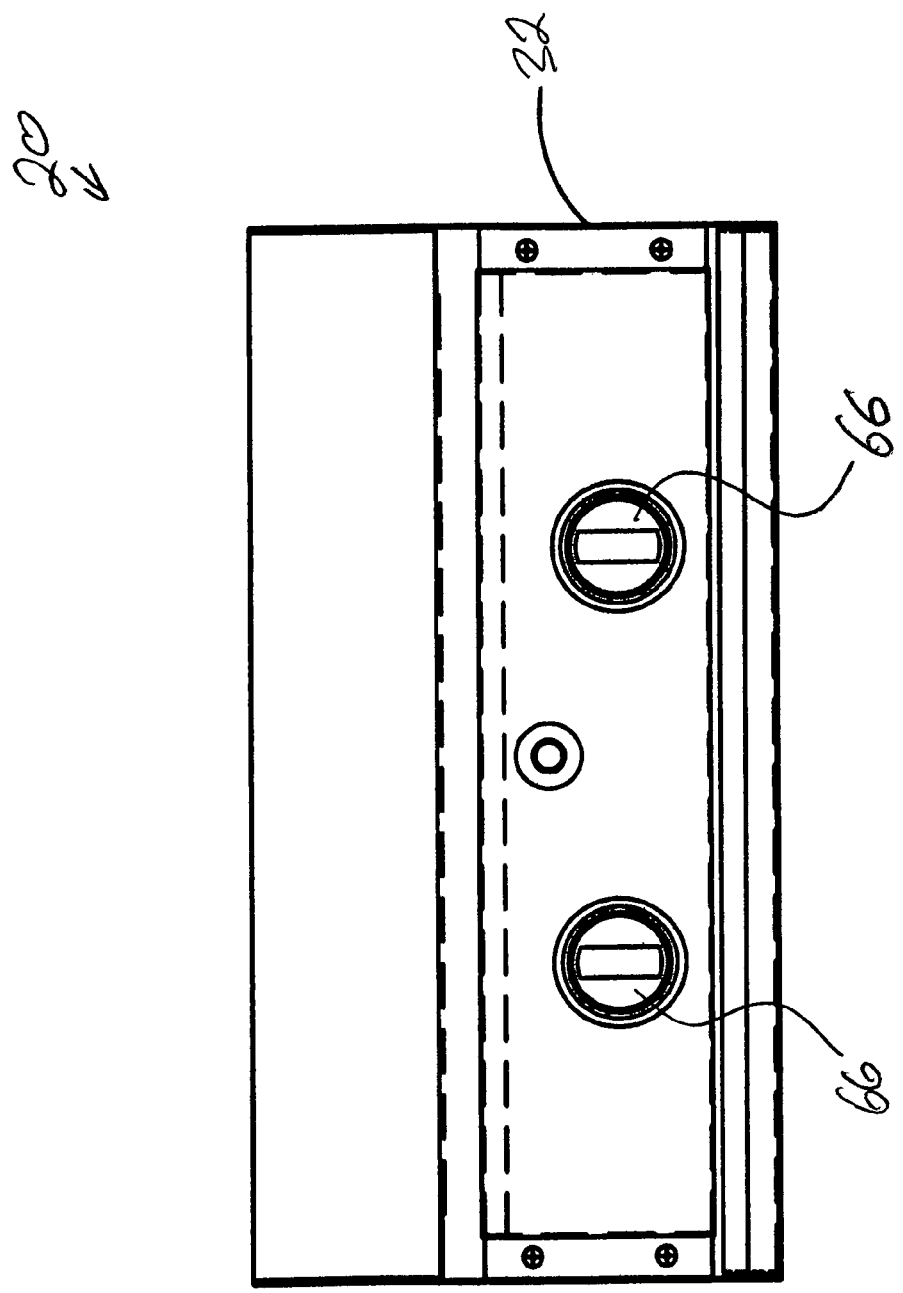
FIG. 2 is a schematic, front elevation view of the cooking apparatus of FIG. 1.

Referring now in greater detail to the drawings, in which like numerals refer to like parts throughout the several views, FIGS. 1-4 schematically illustrate a cooking apparatus 20 (e.g., broiler or grill) that includes two sources of energy (e.g., heating units 22), with each of the heating units being respectively associated with an infrared radiant energy emitter 24 and a grid 26, in accordance with an exemplary embodiment of the present invention. The heating units 22 function to heat the energy emitters 24 so that the energy emitters emit infrared radiation, such as for cooking (e.g., broiling) food on the grids 26. The energy emitters 24 can be heated in any conventional manner. For example, the heating units 22 can be gas burners or electrical heating elements, or the like. Nonetheless and not for the purpose of narrowing the scope of the present invention, the heating units 22 are described herein as being infrared radiant burner units 22.

Figure 5:
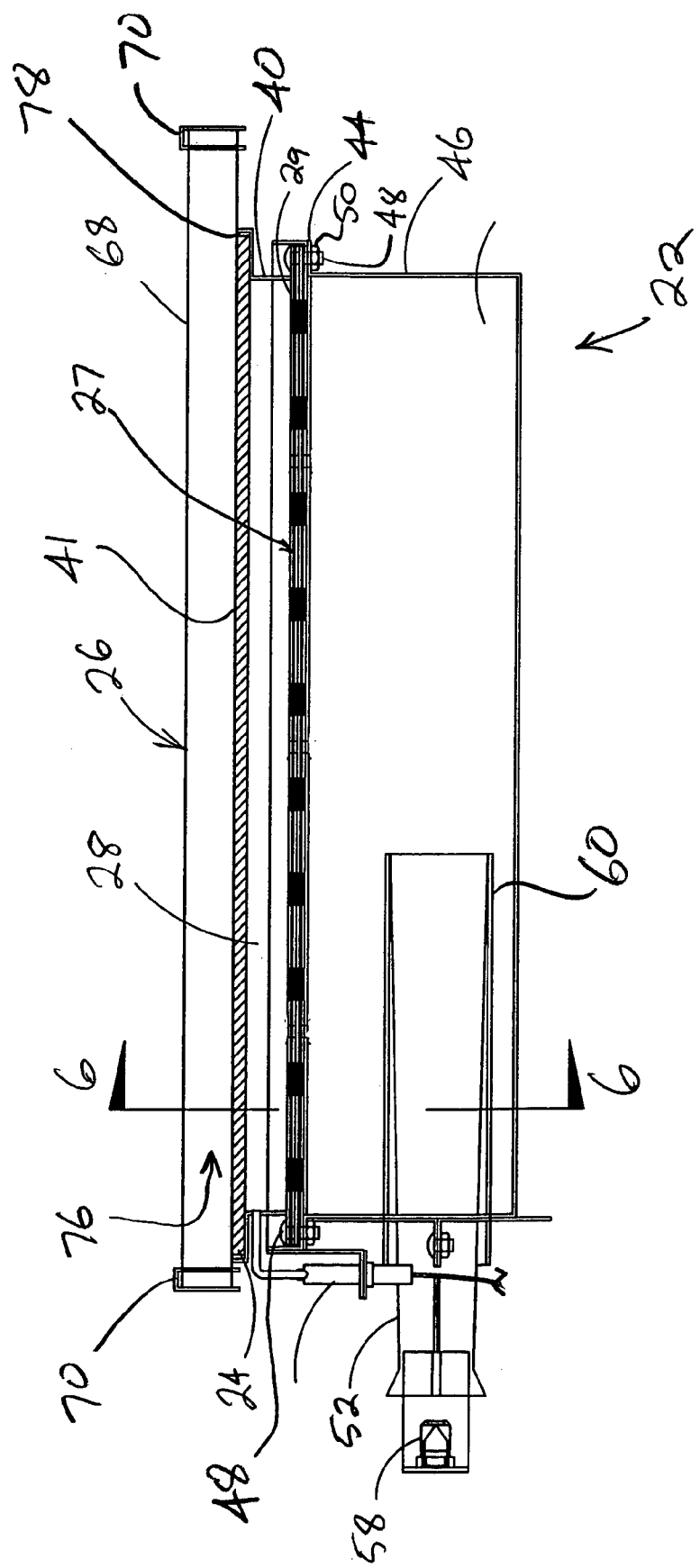
FIG. 5 is an isolated, schematic, cross-sectional view of a subcombination of the cooking apparatus taken generally along lines 4-4 of FIG. 1.
Figure 6:
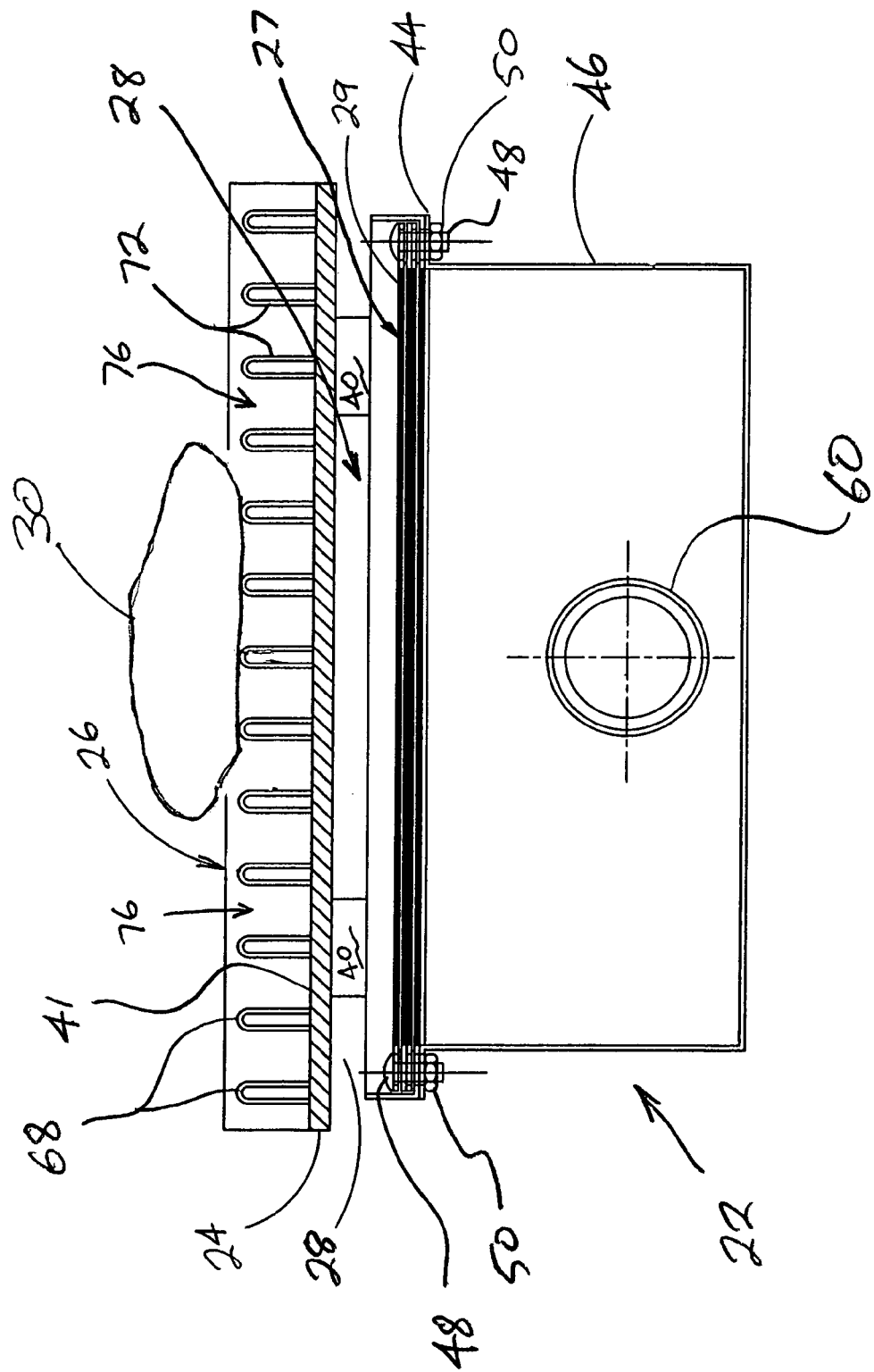
FIG. 6 is an isolated, schematic, cross-sectional view of the subcombination taken along lines 6-6 of FIG. 5.

Very generally described, and as best understood with reference to FIGS. 5 and 6, each burner unit 22 operates by burning gaseous fuel so that combustion (not shown) is proximate an outer, combustion surface 29 of a burner plate or assembly (e.g., burner element 27) and is typically at least partially within a space 28 between the burner unit and the radiant energy emitter 24. In accordance with the exemplary embodiment, the burner element 27 is constructed so its combustion surface 29 also emits radiant energy. The emitter 24 typically absorbs a substantial portion of the heat from the flames of the combustion and combustion byproducts, as well as a substantial portion of the radiant energy emitted by the burner element 27. The emitter 24 is the part of the cooking apparatus 20 that functions to ultimately emit the radiant energy that is used for heating (e.g., cooking) items such as, but not limited to, food 30 (FIG. 6). The food 30 can be supported by the grid 26, or the food 30 can be supported by other means (e.g., a rotisserie (not shown)) that would typically be adjacent the grid 26. In accordance with the exemplary embodiment of the present invention, the infrared emitters 24 are used for broiling food 30, with the grids 26 supporting the food and being mounted to, or installed in a way that, the grids 26 respectively substantially adjoin the emitting sides of the infrared emitters 24. In accordance with one aspect of the present invention, each of the grids 26 is configured (e.g., is in sufficiently close proximity to the emitter 24) so that the cooking apparatus 20 can substantially overcome problems associated with flare-up and can provide substantially uniform energy distribution over the upper surfaces of the cooking grid 26, as will be discussed in greater detail below. In some situations, the prevention of flaring up can be enhanced by keeping the temperature of the emitter 24 below about 850 degrees Fahrenheit, or below about 800 degrees Fahrenheit.

An emitter 24 and associated grid 26 can be used in many different applications. More specifically, a burner unit 22 and its associated emitter 24 and grid 26 can be used in many different applications. For example, a burner unit 22 and its associated emitter 24 and grid 26 can be used in an outdoor grill cabinet generally like that disclosed in U.S. Pat. No. 6,114,666. U.S. Pat. No. 6,114,666 is incorporated herein by reference, in its entirety. Indeed, the combination of the emitter 24 and associated grid 26, or the like, is well suited for use in many different types of cooking apparatus beyond those specifically described herein.

The cooking apparatus 20 can include more than two, or less than two, of the burner units 22 and associated emitters 24 and grids 26. Whereas each of the burner units 22 can have a dedicated emitter 24 and grid 26, it can also be the case that multiple burner units 22 can be associated with a single emitter 24 that is sized to accommodate the multiple burner units, and/or multiple emitters may be associated with a single grid 26 that is sized to accommodate the multiple emitters, and/or multiple grids may be associated with a single emitter that is sized to accommodate the multiple grids, or the like. For ease of explanation, rather than for the purpose of narrowing the scope of the present invention, in much of the following Detailed Description section of this disclosure a single burner unit 22 with a dedicated emitter 24 and grid 26 are described.

Figure 3:
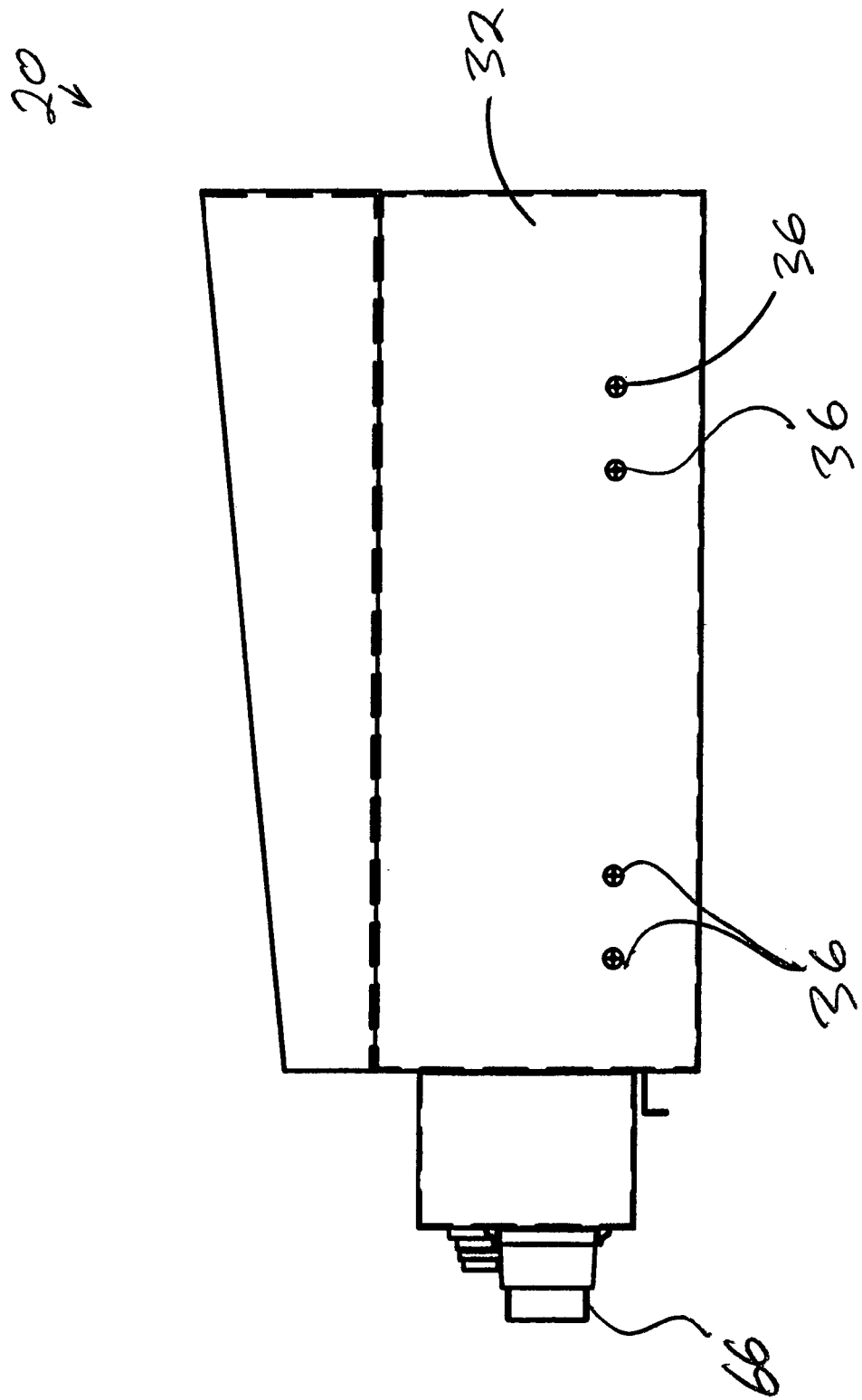
FIG. 3 is a schematic, right side elevation view of the cooking apparatus of FIG. 1. A schematic, left side elevation view of the cooking apparatus is a mirror image of FIG. 3.
Figure 4:
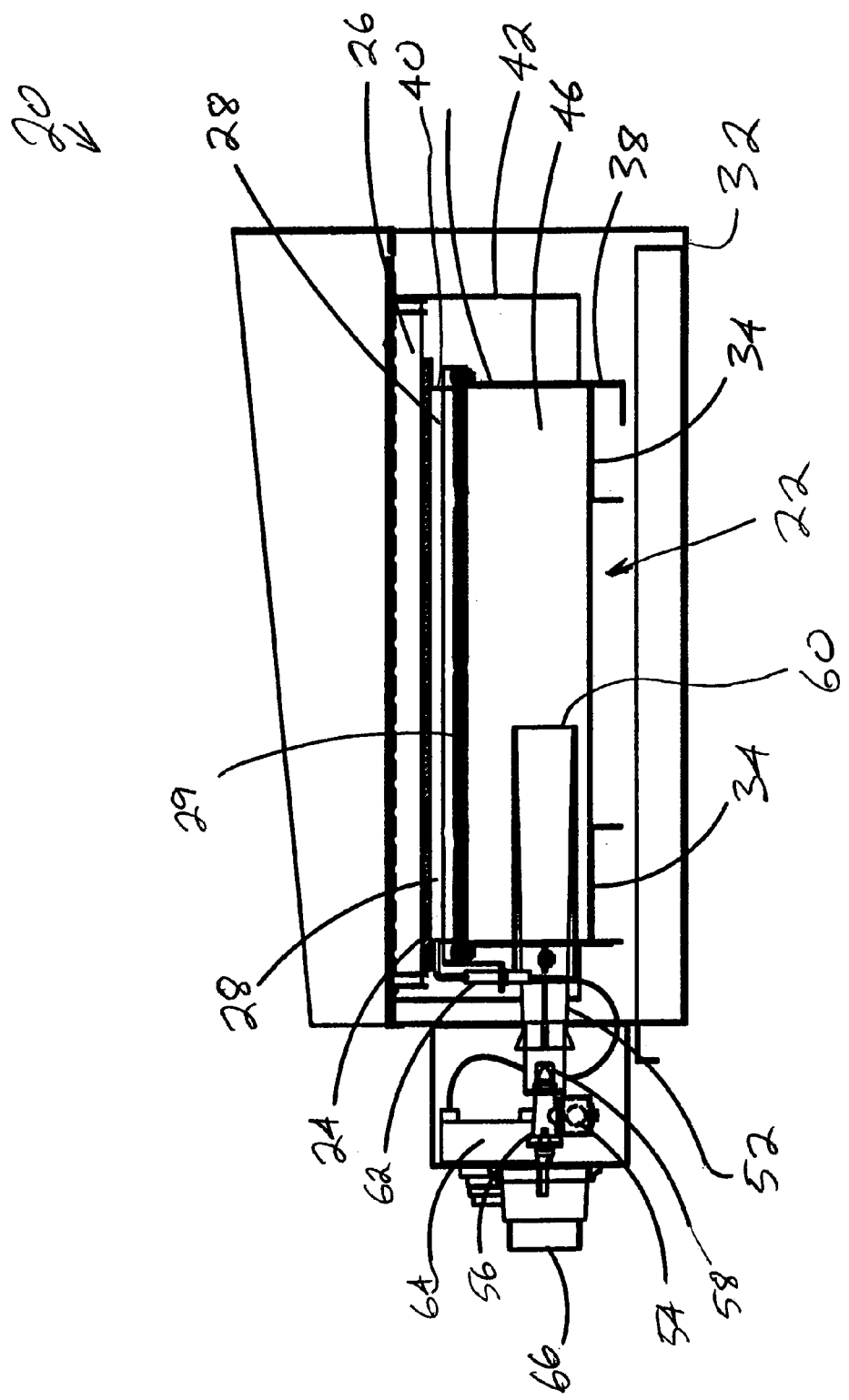
FIG. 4 is a schematic, cross-sectional view of the cooking apparatus taken generally along lines 4-4 of FIG. 1.

The general configuration of the cooking apparatus 20 of the exemplary embodiment of the present invention can be best understood with reference to FIGS. 1-4, and primarily with reference to FIG. 4. The cooking apparatus 20 includes a cabinet 32 that has horizontal support brackets 34 held in position by fasteners 36 (FIG. 3). The fasteners 36 can be in the form of nuts and bolts, although other fasteners can be used. The burner unit 22 is vertically supported by the horizontal support brackets 34 or any other suitable structure. The burner unit 22 is secured to the horizontal support brackets 34 by vertical support brackets 38 or by any other suitable structure. The radiant emitter 24 can be supported by the burner unit 22 by way of mounting clips 40 or other suitable structures, as will be discussed in greater detail below. The cooking grid 26 can rest upon the emitter's emitting surface 41 or otherwise be in close proximity to the emitter 24, as discussed in greater detail below.

Although orientations are described in this Detailed Description section of this disclosure using terms such as "vertical," "horizontal," "above" and "below" in an effort to be consistent with the figures provided herewith, orientations of the emitter 24 and associated grid 26 are not limited to those described herein. That is, although the figures herewith illustrate the emitter 24 extending horizontally with the grid 26 positioned thereabove, other orientations are also within the scope of the present invention.

Reference will now be made in greater detail to FIGS. 5 and 6, which are schematic cross-sectional views of one of the burner units 22 and its associated energy emitter 24 and grid 26, in accordance with the exemplary embodiment of the present invention. As mentioned above, the burner unit 22 includes a burner element 27, and it further includes a plenum 46. Marginal portions of the burner element 27 are mounted to a peripheral flange 44 of the plenum 46 to form a gas-tight seal around the perimeter of the plenum. Optionally, the burner unit 22 can include a baffle assembly having one or multiple baffles, and the baffle assembly can be interposed between the burner element 27 and the plenum 46. The plenum's flange 44 includes mounting holes (not shown) for facilitating mounting of the burner element 27. The burner element 27 can be mounted to the peripheral flange 44 of the plenum 46 by respectively aligning the mounting holes (not shown) of the burner unit 22 with the mounting holes of the plenum's flange 44, then passing male fasteners 48 (e.g., bolts, or the like) respectively through these holes and optionally respectively attaching female fasteners 50 (e.g., nuts, or the like) to the male fasteners. Other methods and apparatus for mounting or otherwise associating the burner element 27 to the plenum 46 are also within the scope of the present invention.

As generally mentioned above, the infrared radiant energy emitter 24 can be held by mounting clips 40 that retain the emitter 24 within about an inch or less of the combustion surface 29 of the burner element 27, and so that the space 28 is defined between the emitting (e.g., upper) surface of the burner element 27 and the lower surface of the radiant energy emitter 24. The space 28 defined between the burner element 27 and the emitter 24 includes a peripheral exhaust opening defined between the periphery of the burner unit 22 and the periphery of the emitter 24.

Each mounting clip 40 can include a lower horizontal flange that is in opposing face-to-face engagement with the upper surface of the burner unit 22 and held thereto by a respective one of the male fasteners 48. Each mounting clip 40 can also include an upper horizontal flange that is in opposing face-to-face engagement with the bottom surface of the emitter 24. A tab can extend upwardly from each upper horizontal flange of the clips 40 for engaging an outer edge of the emitter 24. Alternatively, the emitter 24 can be mounted by other means.

As generally illustrated in FIGS. 4-6, the cooking grid 26 rests upon the emitter's emitting surface 41, and ends and side(s) of the grid 26 respectively abut walls of a heat shield 42 (FIG. 4) portion of the cabinet 32. Alternatively, the cooking grid 26 can be mounted so that the bottom surface of the cooking grid 26 is positioned slightly above the emitter's emitting surface 41. Such spaced-apart mounting can be achieved, for example, by virtue of mounting brackets (not shown) mounted to the heat shield 42 or another portion of the cabinet 32, or the like. Either type of mounting can be achieved, for example, by virtue of the heat shield 42, or another portion of the cabinet 32, defining or including a peripheral flange or shoulder (not shown) that receives and supports ends and side(s) of the grid 26, or the like.

Referring to the plenum 46 more specifically, and as best understood with reference to FIGS. 4-6, the plenum 46 is formed with an outlet opening that is partially closed as a result of the burner element 27 being mounted to the plenum's flange 44. A gas-air mixture is supplied to the plenum 46 through a venturi 52. Alternatively, the gas-air mixture can be supplied by way of any other conventional means, or the like, such as by way of a connection for a pre-mixture of gas and air, such as a pre-mixture provided by a combustion air blower and mixer (not shown).

More specifically and as best understood with reference to FIG. 4, gaseous fuel can be supplied to a manifold 54 from a pressure regulator (not shown), and then to a valve 56 so that the gas is discharged from the orifice 58 into the throat of the venturi 52. The fuel is throttled to the burner by the valve 56, which is operated by an adjusting knob 66. From the venturi 52, the gas-air mixture flows through a feed pipe 60 that extends through a side wall of the plenum 46 and has an outlet end that is open in the interior of the plenum 46, so that the gas-air mixture flows into the interior of the plenum.

As oriented in FIGS. 4-6, the upper surface of the burner element 27 is the combustion surface 29 of the burner unit 22.

The combustion surface 29 can be metal, ceramic, or ceramic type fibers. The combustion surface 29 contains apertures (not shown) through which a gas-air mixture from the plenum 46 passes. The gas-air mixture can be ignited on the combustion surface 29 of the burner unit 22 by a spark igniter 62 or by any other conventional means. The spark igniter 62 can be energized from its electrical energy source 64. The combustion of the gas-air mixture occurs in the space 28 between the burner unit 22 and the radiant heat energy emitter 24. The desired fuel input to the burner unit 22 can be adjusted with the control knob 66.

After the burner unit 22 is ignited, energy is typically transferred to the radiant emitter 24 by both infrared radiation and convective heat transfer from the hot products of combustion. That is, the emitter 24 is heated by infrared radiation from the red-hot combustion surface 29 of the burner unit 22 and from the hot products of combustion (i.e., the hot products resulting from the flames that are proximate the combustion surface 29 of the burner unit 22). It has been shown that while the emitter 24 can be heated by a conventional port type burner (not shown), the efficiency of the system can be greatly improved with the use of an infrared type of burner unit such as that identified by reference numeral 22. An infrared type burner unit 22 can operate with excess stoichiometric air supplied as primary air through the venturi 52. This is not the case with a conventional port type of burner, which uses secondary air to complete the combustion process. Also, the infrared burner unit 22 can be positioned very close to (e.g., about 0.5 inches from) the emitter 24. When about 5-10% excess primary air is used, there is minimum dilution of the products of combustion and because of the increased gas temperature in the space 28, the temperature difference between the hot gasses in space 28 and the emitter 24 is increased, thus a higher percentage of the energy from combustion is transferred to the emitter 24.

As mentioned above, the grid 26 is positioned in a manner that allows the bottom surface of the grid 26 to touch or be in close relationship to the emitter's emitting surface 41. The grid 26 is not novel per se. In accordance with the exemplary embodiment of the present invention, the grid 26 is metal and includes multiple longitudinal members 68 that are spaced apart from one another in a lateral direction and have ends that are respectively mounted to lateral members 70. Only a representative few of the longitudinal members 68 and their respective parts are identified by their reference numerals in the respective figures herewith, in an effort to clarify the views. The longitudinal members 68 of the grid 26 can run from the front (near side) of the cooking apparatus 20 to the back (far side) of the cooking apparatus, although in some applications the longitudinal members could run between the right and left sides of the cooking apparatus, and other arrangements are also within the scope of the present invention. The grid 26 can be replaced with other structures that provide the desired result. As one example, in some situations the grid 26 is not used for supporting food 30 to be cooked, and the grid 26 can be replaced with other types of partitions, or the like, that are suitable for providing one or more functions described herein with respect to the grid 26.

Figure 7:
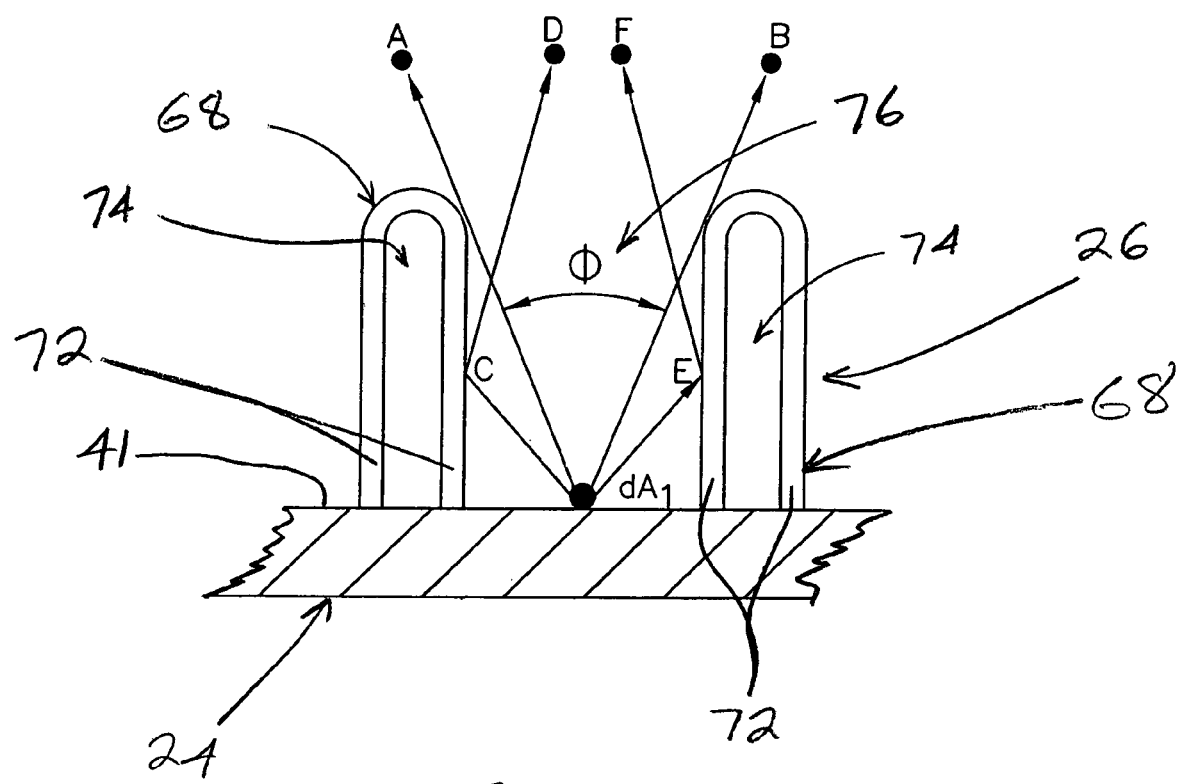
FIG. 7 is a relatively enlarged, cross-sectional view of a portion of the subcombination, with the cross-section taken along lines 6-6 of FIG. 5.

FIG. 7 is generally representative of all cross-sections that are taken at a position between the lateral members 70, perpendicular to the lengths of the longitudinal members 68, and perpendicular to the emitter's emitting surface 41. As best understood with reference to FIGS. 6 and 7, each of the longitudinal members 68 can have a generally inverted U-shape, such that it includes two side walls 72 that are connected to one another at the top. As a result, for each longitudinal member 68, it includes a cavity or chamber 74 defined between its side walls 72. Alternatively, each of the longitudinal members 68 can be solid or shaped differently, so that the longitudinal members do not include the cavities or chambers 74, or so that the cavities or chambers are shaped differently. In accordance with the exemplary embodiment of the present invention, the bottom edges of all of the walls 72 of all of the longitudinal members 68 actually touch (e.g., are in face-to-face contact with) the emitter's emitting surface 41 for the entire length of the emitter 24, or all of the bottom edges of the walls are spaced apart from yet close to the emitting surface of the emitter for the entire length of the emitter (e.g., spaced apart by less than about 0.25 inches, or more specifically less than about 0.10 inches). More precisely, the bottom edges of the walls 72 of the longitudinal members 68 are spaced apart from the emitter 24 by less than 0.25 inches, or more specifically less than 0.10 inches. Due to manufacturing tolerances or for other reasons, the distances between the bottom edges of the walls 72 and the emitting surface 41 can vary across the emitting surface, but ideally the variations are not so large that they have a significant negative impact with respect to one or more of the advantages provided by the present invention.

For each adjacent pair of longitudinal members 68, a discrete open chamber/cavity 76 is defined between the respective side walls 72 of the adjacent longitudinal members (i.e., the side walls 72 that are in opposing face-to-face relation with one another across the respective cavity), with the emitter's emitting surface 41 closing or at least substantially closing the cavity 76 at its bottom, so that the cavity 76 is enclosed, or at least substantially enclosed, on three sides. In accordance with the exemplary embodiment of the present invention, the longitudinal members 68 are elongate and the grid 26 only includes two of the lateral members 70 that are respectively located at the ends of the longitudinal members; therefore, the cavities 76 are in the form of elongate channels that are open at the top. In accordance with an alternative embodiment of the present invention, the grid 26 includes a plurality of additional lateral members positioned between the ends of the longitudinal members such the cavities 76 are not necessarily longer in one direction than the other. Indeed, cavities 76 of a variety of different shapes and orientations are with the scope of the present invention.

As illustrated in FIGS. 1 and 5, the longitudinal members 68 and associated elongate cavities 76 can be longer than the underlying emitter 24 so that excess residues, or the like (e.g., fluids such as juices from food 30 being cooked), can flow off of the emitter's emitting surface 41 by traveling across and falling downwardly from an edge 78 of the emitter. Notwithstanding the foregoing, under most normal circumstances substantially all of the oils and juices that originate from the food 30 being cooked are vaporized by the infrared emitting apparatus (e.g., the combination of the emitter 24 and grid 26) in a manner that seeks to provide a "charbroiled taste" to the food.

The discrete cavities 76 are respectively associated with and include, or are at least partially defined by, discrete segments of the emitter's emitting surface 41, whereby the longitudinal members 68 have the effect of defining discrete segments of the emitter's emitting surface 41. That is, the longitudinal members 68 and/or the side walls 72 can be generally characterized as partitions that divide the emitter's emitting surface 41 into the discrete segments that are seen in FIG. 1. More specifically, each of the cavities 76 includes an inner portion (e.g., bottom) that includes, or is at least partially defined by, a respective segment of the emitting surface 41 of the emitter 24. In accordance with the exemplary embodiment of the present invention, the outer openings (e.g., tops) of the cavities 76 typically remain open, except that they may be obstructed or partially obstructed by food 30 that is upon the upper surface of the grid 26 while the food is being cooked.

An advantage of the contact or near contact between the bottom surfaces of the grid 26 and the emitting surface 41 of the infrared emitter 24 is that it at least substantially restricts any free flow of air between the emitting surface 41 and the grid 26. Another advantage is that it creates the cavities 76 such that in each cavity, the infrared energy emitted by the respective segment of the emitter's emitting surface 41 is substantially directed toward the outer opening of the cavity or to the side walls 72 that partially define the cavity (i.e., the cavity's side walls 72). For each of the cavity's side walls 72, it will typically absorb or reflect the radiant energy that is directed to it from the respective segment of the emitting surface 41 (e.g., the segment of the emitting surface 41 that is between the cavity's side walls 72). Part or all of the absorbed energy will be re-emitted since all bodies at any temperature above absolute zero are continually radiating infrared radiant energy to their surroundings, even though they may at the same time be absorbing more energy than they emit. When more energy is absorbed than emitted, the temperature of the absorbing body will increase or the absorbing body will transfer heat by some other form (conduction or convective). The longitudinal members 68 will reach an equilibrium temperature and will re-radiate radiant energy. At equilibrium temperature, all of the radiant energy emitted from the side walls 72 will eventually be discharged out the respective outer openings of the cavities 76 even though there will be constant exchange of energy between the side walls 72 and the emitter 24. When all of the surfaces of a cavity 76 (i.e., the respective side walls 72 and the respective segment of the emitting surface 41 that define the cavity) are at an equilibrium temperature, substantially all of the radiant energy generated within the cavity will be discharged from the outer opening of the cavity. A small amount of energy will dissipate from the longitudinal members 68 by convective heat transfer. However, since air movement beneath the longitudinal members 68 is substantially restricted or even completely eliminated, the convective heat transfer will be negligible. In addition, and depending to some degree upon the heights of the longitudinal members 68 and their coefficients of conductivity, some relatively small amount of heat will be conducted between the tops of the longitudinal members and any food 30 thereupon, which can advantageously result in the formation of sear marks on the surface of the food. Accordingly, in accordance with the exemplary embodiment of the present invention, substantially all energy that originates from the emitting surface 41 exits the grid 26, via the outer openings of the cavities 76, as radiant energy. For example, convective heat transfer from the top of the grid 26 accounts for less than about 5% of the energy that originates from the emitting surface 41

FIG. 7 schematically illustrates how predetermined portions of the radiant energy are selectively interacted with after being emitted from a representative segment of the emitting surface 41, and how the radiant energy subsequently emerges from the outer openings of the discrete cavities 76, in accordance with the exemplary embodiment of the present invention. The cavities 76 can be characterized as open chambers, because the infrared radiation emitted from the segments of the emitter's emitting surface 41 respectively pass through the open chambers/cavities 76. As illustrated for example in FIGS. 6 and 7, the open chambers/cavities 76 typically extend perpendicularly away from the emitter's emitting surface 41. As best understood with reference to FIG. 7, the emitting surface 41 of the emitter 24 is a diffusely radiating surface, and $dA_1$ designates an element of the diffusely radiating surface. All infrared radiation emitted from the element $dA_1$ between the points designated A and B (e.g., a predetermined portion of the infrared radiation) in FIG. 7 will exit the outer opening of the discrete cavity 76 without being absorbed or reflected by the side walls 72. Another predetermined portion of the infrared radiation will interact with the side walls 72. More specifically and for example, the radiant energy emitted from $dA_1$ to point C on the left side wall 72 of the cavity 76 is shown as being reflected to the outer opening of the discrete cavity 76, so that it indirectly reaches the outer opening. As another example, the radiant energy emitted from $dA_1$ to point E on the right side wall 72 of the cavity 76 is shown as being absorbed and re-emitted to point F, so that it indirectly reaches the outer opening of the discrete cavity 76. By creating the individually discrete cavities 76 and their respective segments of the emitter's emitting surface 41, the total radiant body can advantageously substantially emulate a black body.

In accordance with one aspect of the present invention, in addition to the cooking apparatus 20 overcoming problems associated with flare-up, it can also provide uniform energy distribution over the upper surfaces of the cooking grid 26 within about +/−4.0% over about a square foot. More generally, it can provide uniform energy distribution over the upper surfaces of the cooking grid 26 within about +/−6.0% over about a square foot. Even more generally, it can provide uniform energy distribution over the upper surfaces of the cooking grid 26 within about +/−8.0% over about a square foot. More precisely, the uniform energy distribution over the upper surfaces of the cooking grid 26 can be within +/−4.0% over a square foot, or within +/−6.0% over a square foot, or within +/−8.0% over a square foot. Generally described, this uniformity in energy distribution can result from segregating the emitter's emitting surface 41 as described above, and as will be discussed in greater detail below. As mentioned above, the flare-up can be controlled by the close arrangement between the cooking grid 26 and the emitter's emitting surface 41. In this regard, it has been determined that flare-up can be greatly reduced or eliminated by having the bottom surfaces of the longitudinal members 68, and in some designs also cross components, of the cooking grid 26 touch or nearly touch the emitting surface 41 to prevent the free flow of air under the food 30 thus limiting the supply of combustion air to the hot oils discharged from fat in the food (e.g., meat). Accordingly and in accordance with the exemplary embodiment of the present invention, the emitter's emitting surface 41 is a solid surface in that it substantially does not include any perforations that extend through the emitter's emitting surface 41 in a manner that would allow air, or the like, to flow through the emitting surface. In addition, the emitter's emitting surface 41 is typically planar.

A suitable emitter 24 is the glass emitter described by U.S. Pat. No. 6,114,666 to Best, which is incorporated herein by reference, in its entirety. Alternatively, the emitter 24 can be high temperature metal, such as 310 stainless steel, after it is oxidized. Other heat resistant materials, such as glass-coated or ceramic-coated metal or high-strength ceramics could be used for the emitter 24. Experiments have been conducted using some natural stones, such as granite, as the emitter 24 with successful results. In accordance with an alternative embodiment of the present invention, the emitter 24 can be any conventional emitter, such as woven metal screen that includes a multiplicity of passages extending therethrough, although an emitting apparatus including such a screen emitter would not perform as advantageously, in some regards, as the emitting apparatus (e.g., emitter 24 plus grid 26) of the exemplary embodiment of the present invention. In accordance with the exemplary embodiment of the present invention, the emitter 24 and the grid 26 are discrete components constructed of different materials (e.g., glass and metal, respectively). In accordance with an alternative embodiment of the present invention, the emitter and the grid are at least somewhat less discrete. As one example, the emitter and the grid can together be in the form of a single, unitary piece that is, for example, formed from metal.

The emissivity of the emitter's emitting surface 41 can play an important role in improving the emission of infrared energy from the emitter 24. However and in accordance with one aspect of the present invention, experiments have demonstrated that the radiant energy output of the infrared emitting apparatus of the present invention advantageously does not decrease in direct proportion to a decrease in the emissivity of the emitting surface 41 when the emitting surface is in contact with the cooking grid 26. The cooking grid 26 limits free convection air currents from cooling the emitter 24, thus decreasing the heat transfer by free convection from the surface of the emitter. Since the emitter 24 is dependent on dissipating most of its absorbed energy in the form of infrared radiation, there is a compensating factor in that the temperature of the emitter increases to some degree to compensate for the lower emissivity. Therefore, the total radiation or emission from the emitter 24 is increased based on the increase in temperature of the emitter.

While it has been demonstrated that a metal surface with an emissivity of about 0.5 can suitably perform as the emitter 24, the exemplary embodiment of the present invention ideally, although optionally, incorporates an emitter with an emissivity greater than about 0.85 because for the same total radiant energy emitted, the emitting surface 41 can be at a lower temperature with the higher emissivity. The relationship between the emissivity and the emitting surface temperature to the output of radiant energy is shown by the Stefan-Boltzmann Law. According to this law, the total emission of radiant energy from a perfect emitter of Area A in unit of time is:

$$Q_B = \sigma A_1 T^4$$

Figure 8:
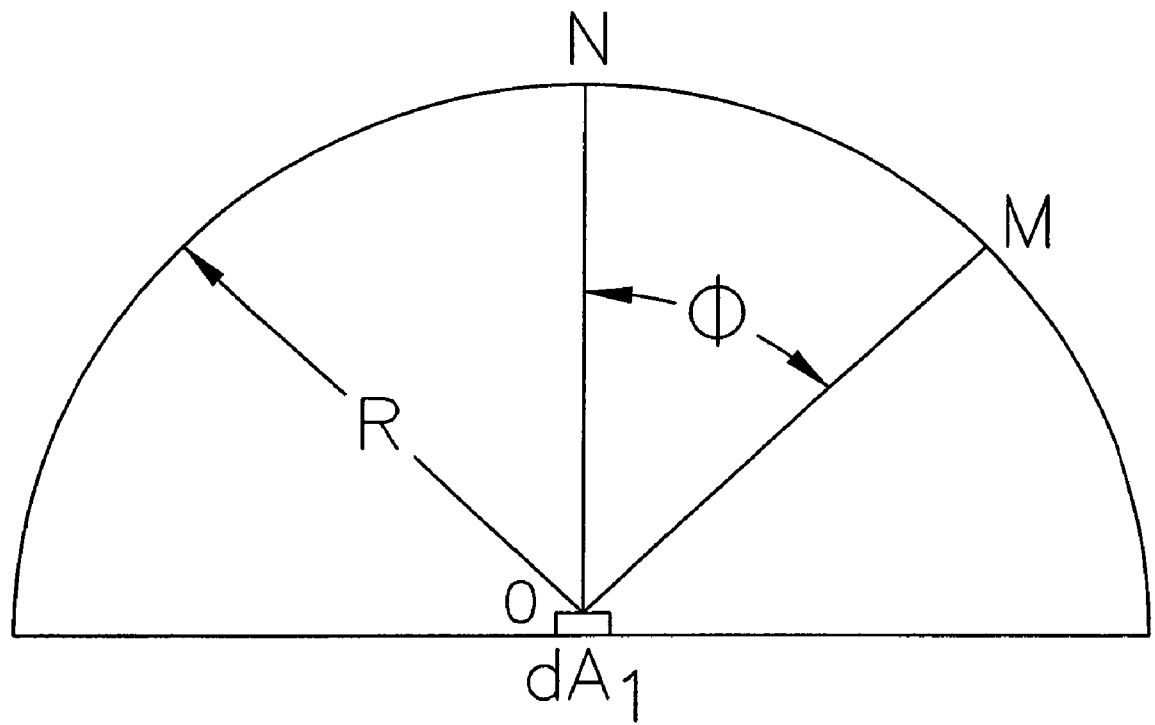
FIG. 8 schematically illustrates energy being radiated by a diffusely radiating surface.

$Q_B$ = Radiant flux from a black body
$\sigma$ = Constant = $0.173 \times 10^{-8}$
$A_1$ = Area of black body emitter
$T_4$ = °Rankine to the fourth power By dividing the emitting surface 41 into the longitudinal segments that are respectively associated with the cavities 76, the distribution of the radiant flux (rate of transfer of energy across a given surface) over the upper surfaces of the cooking grid 26 can be greatly improved over prior art type grills. According to the Cosine Law of Lambert, an evenly heated diffusely radiating plane surface facing upward will have a concentration of energy above and at its center. In this regard, in FIG. 8 an element of a diffusely radiating surface is marked by $dA_1$. The rate of energy radiated by $dA_1$ in the direction OM is proportional to the cosine of the angle $\Phi$ between OM and ON (ON is the normal to $dA_1$), because from M as eyepoint, a surface $dA_1$ multiplied by cos $\Phi$ is seen which at equal space distribution of radiation appears as bright as the area $dA_1$ seen from N. (See calculation of the Total Radiation by Means of Lambert's Law—"Heat Transfer" by the late Max Jakob, pg. 27).

Based on the Cosine Law of Lambert, even when a surface is uniformly heated, the emission from the surface is not uniformly distributed. In this regard, by separating the emitter's emitting surface 41 into the discrete segments (e.g., respectively associated with the cavities 76) by the longitudinal members 68, the flux density at the outer openings of the cavities 76 becomes far more uniform because for each of the cavities, all or nearly all of the radiant energy emitted or reflected within the discrete cavity is contained within its walls and is ultimately discharged through the outer opening of the cavity. After the walls 72 of the grid 26 have reached an equilibrium temperature, they will respectively radiate energy to each other and to the outer opening of the discrete cavities 76. Ultimately, the energy will be emitted at an angle from the walls 72 that will respectively allow the radiant energy to be discharged through the outer openings of the discrete cavities 76.

In accordance with the exemplary embodiment of the present invention, the cooking apparatus 20 can emit the radiant energy to the food 30 (e.g., the area adjacent the upper surfaces of the cooking grid 26) more uniformly than comparable prior art grills. This phenomena is the result of the emitting surface 41 being divided into the discrete segments (e.g., by the longitudinal members 68 being at least closely adjacent to the emitting surface) and the food 30 being placed in relatively close proximity to the emitting surface 41. In accordance with the exemplary embodiment of the present invention, the food 30 is less than about 1.5 inches from the emitter's emitting surface 41; therefore, the depth of the cooking grid 26 is less than about 1.5 inches. The depth of the cooking grid 26 can be in the range from about 0.5 inches to about 1.5 inches. In one specific example, the depth of the cooking grid 26 is about 0.75 inches. More precisely, the depth of the cooking grid 26 can be is less than 1.5 inches. More precisely, the depth of the cooking grid 26 can be in the range from 0.5 inches to 1.5 inches. More precisely, the depth of the cooking grid 26 can be 0.75 inches.

Figure 9:
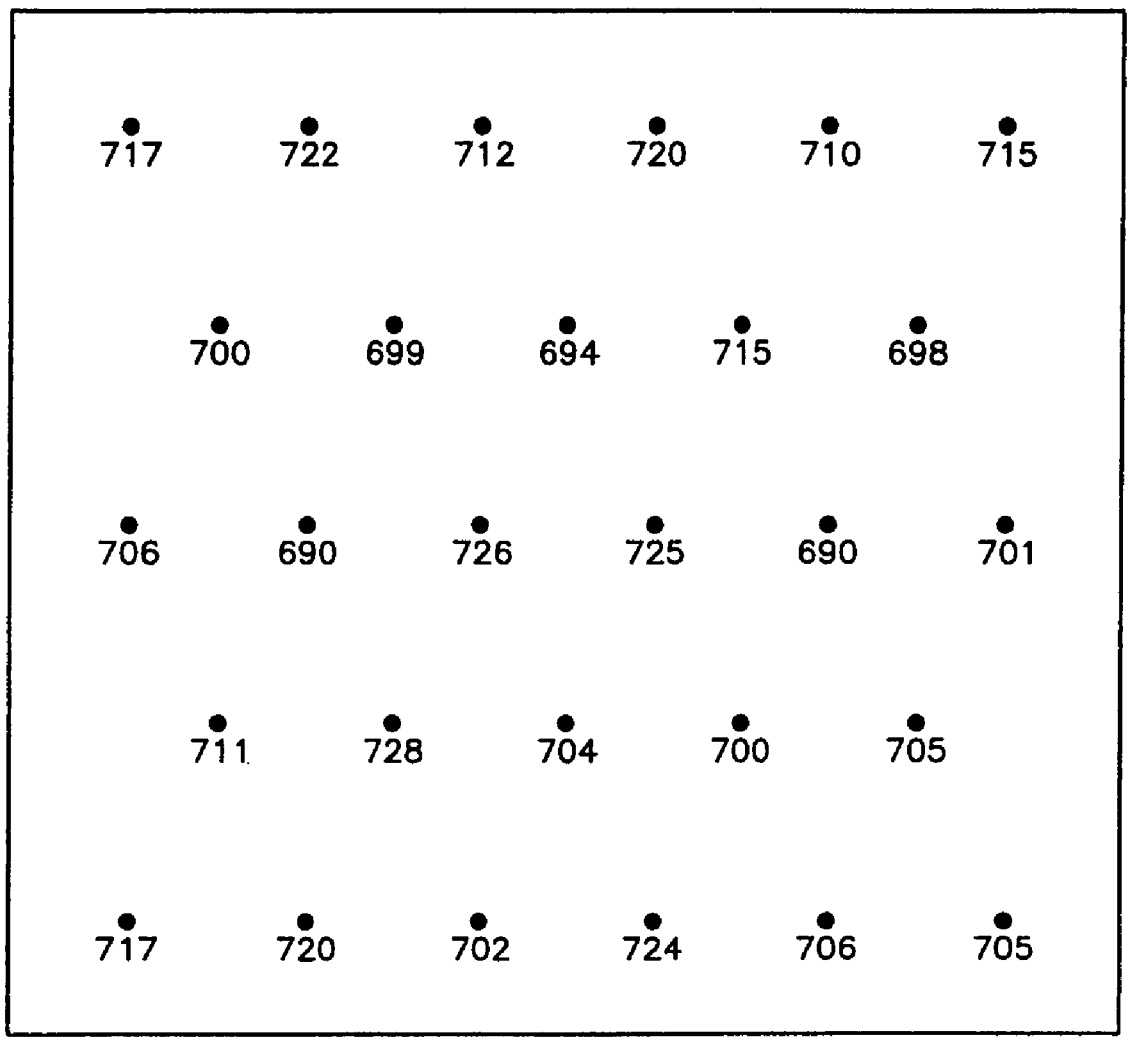
FIG. 9 is a partial, schematic top plan view of the subcombination of FIG. 5, and more particularly it illustrates a typical energy distribution over an emitting apparatus, in accordance with the exemplary embodiment of the present invention.

FIG. 9 represents a typical energy distribution in close proximity over an emitting apparatus (e.g., the emitter 24 and grid 26 in combination) that is 18 inches by 19 inches, in accordance with an exemplary embodiment of the present invention. FIG. 9 schematically illustrates dots that are respectively representative of small areas in a common plane that is parallel to the plane of the emitting surface 41, with the temperatures, in degrees Fahrenheit, being respectively shown for the small areas at an instant in time. The maximum heat variation between the high and low temperatures is only 36° F. This compares to over 200° F. variation in typical prior art grills. The report of the Food Service Technology Center states, "a temperature variation of 200° F. or more across the cooking area of a broiler would be considered normal."

Regarding FIG. 9 more specifically, the illustrated temperatures were obtained by using multiple 2 inch by 2 inch steel plates (not shown) coated with glass and having an emissivity above 0.9. The plates were placed side by side on top of a grid 26, with the grid being on top of an emitter 24, and the emitter being positioned above an operating burner unit 22. The temperature of each of the plates was obtained using a pyrometer.

In a recent test by the Food Service Technology Center (FSTC Report 5011.03.04) a Thermal Engineering Corporation (TEC®) model IR2003-S broiler was tested to ASTM standard test method F1695-96. The grill tested is disclosed in U.S. Pat. No. 4,886,044. In the executive summary of the FSTC report, the conclusion was that "the IR2003-S outperformed all other gas underfired broilers tested at the FSTC to date." The broiler achieved a heavy load cooking efficiency of 40.7% and the report further states that the light load efficiency was unparalleled to date at the FSTC. In accordance with the exemplary embodiment of the present invention, the cooking apparatus 20 has reduced the fuel input to 40% less than that of the test broiler (i.e., the broiler disclosed in U.S.

Pat. No. 4,886,044) with about the same performance. In accordance with one aspect of the present invention, the cooking apparatus 20 operates using about 40% less fuel per unit area of cooking surface than any typical prior art type broiler or grill, with more than 60% reduction in energy consumed compared to some of the prior art type grills.

This demonstrated improvement in efficiency of the cooking apparatus 20 of the exemplary embodiment of the present invention is the result of the unique design that provides for a reduction of the circulation of air under the food 30 in combination with the closely-spaced relationship of the cooking grid 26 and the infrared emitter 24. The grid 26 restricts the free flow of convective air movement under the cooking grid and therefore inhibits any cooling effect to the emitter 24 or to the bottom of the food 30. The food 30 placed on the upper surface of the cooking grid 26 receives the majority of its absorbed energy in the form of infrared radiant energy from the emitter 24 and from the side walls 72 of the cooking grid 26. Therefore, any dilution of the available energy to transfer heat energy to the food 30 is substantially prevented. One factor that contributes to the poor efficiency of prior art gas grills or broilers is that the energy available is severely diluted by excess air. Usually there are air openings for air to enter the grills or broilers and dilute the available energy below the cooking grids. This severe dilution is indicated in prior art broilers by the very low $CO_2$ readings at the grid surface of a gas-fired unit. A primary reason for this type of dilution is that port type burners used in prior art type grills require secondary air for complete combustion of the fuel and because of poor mixing and other factors; the excess air can be as much as 700% in some prior art grills.

The problem of very poor efficiency of grills and broilers is illustrated in the Food Service Technology Center Report 5011.02.26, pages 4-14. It states, "this translates to a real-world cooking-energy efficiency of only 5%, significantly less than 25-35% efficiencies reported for discrete-load test (Table 4-2 and FIG. 4-14). Restated, only 5% of the energy consumed by an underfired broiler in an actual kitchen is delivered to the food product." Infrared energy type gas grills have improved the efficiency of underfired broilers or grills, and such a grill is described by U.S. Pat. No. 4,886,044 to Best. The improvement in performance over other types is presented in Food Service Technology Report 5011.03.04. The grill or broiler 20 of the present invention provides still another advancement in performance and reduced fuel consumption over that of the grill or broiler described by U.S. Pat. No. 4,886,044 to Best by about 40% with about the same cooking speed.

The closely-spaced relationship of the emitter 24 and cooking grid 26 contributes to improved efficiency by reducing to a minimum air flow (free convection) under the food 30. This restriction of air flow also reduces to a minimum the ignition of oils and fat (discharged while cooking meat) because of reduced air for combustion. Further improvement in the efficiency can be achieved if the burner unit 22 is of the type that operates with excess primary air to preclude the use of secondary air. This prevents the secondary air from diluting and cooling the products of combustion. It also allows for the combustion surface 29 of the burner unit 22 to be located very close to (e.g., about 0.5 inches from) the emitter 24. A type of burner that incorporates these benefits and features is the subject of U.S. Provisional Application No. 60/582,276, filed Jun. 23, 2004, and the U.S. regular utility patent application that is entitled "Radiant Burner," names the same inventor as the present application, and is being filed on the same day as the present application. Both U.S. Provisional Application No. 60/582,276 and the U.S. regular utility patent application that is entitled "Radiant Burner," names the same inventor as the present application, and is being filed on the same day as the present application, are incorporated herein by reference, in their entirety.

The cooking apparatus 20 of the exemplary embodiment of the present invention can fulfill many of the desirable characteristics of an advanced underfired broiler, to be developed, that is discussed in the Food Service Technology Report 5011.02.26, specifically, the following: improved uniformity and reduced energy consumption. The dramatic reduction in energy consumption further contributes to reduced ambient heat gain and lower emissions. Food quality can be improved because of higher moisture retention and less shrinkage. Also, substantially all of the oils and juices can be vaporized with the cooking apparatus 20 of the exemplary embodiment, improving the "charbroiled taste".

It will be understood by those skilled in the art that while the present invention has been discussed above with reference to several embodiments, various additions, modifications and changes can be made thereto without departing from the spirit and scope of the invention as set forth in the following claims.

What is claimed is:

1. An apparatus for cooking food with infrared radiation, the apparatus comprising:

at least one infrared energy emitter for emitting at least the infrared radiation, said emitter having an emissivity of at least about 0.5; and at least one grid mounted for having a first side of said grid support the food at a position so that at least some of the infrared radiation will cook the food, wherein said grid has a second side that is opposite from said first side and is positioned between said first side and said emitter's emitting side, at a central area of said grid, said second side of said grid is in substantially close proximity to said emitting side of said emitter for substantially restricting any airflow in any space between said second side of said grid and said emitting side of said emitter, at least a substantial portion of said second side of said grid is no more than about 0.25 inches from said emitting side of said emitter, said grid comprises a plurality of grid members that each extend away from said emitting side of said emitter, said plurality of grid members are configured so that a plurality of cavities are respectively positioned between adjacent grid members of said plurality of grid members, and for each cavity of said plurality of cavities, said cavity is configured for allowing infrared radiation emitted from said emitting side of said emitter to pass through and out of said cavity for cooking the food, comprising said cavity extending away from said emitting side of said emitter, said cavity extending from said second side of said grid to said first side of said grid, and said cavity being open at said first side of said grid.

2. The apparatus according to claim 1, wherein at least a substantial portion of said second side of said grid is in contact with said emitting side of said emitter.

3. The apparatus according to claim 1, wherein a distance that is perpendicular to said emitting side of said emitter, and is measured between said first side of said grid and said second side of said grid, is at least about 1 inch.

4. The apparatus according to claim 1, wherein a distance that is perpendicular to said emitting side of said emitter, and is measured between said emitting side of said emitter and said first side of said grid, is less than about 1.5 inches.

5. The apparatus according to claim 1, wherein said emitter's emitting side is at least a substantially solid surface.

6. The apparatus according to claim 1, wherein said grid is arranged so that substantially all energy that originates from said emitting side of said emitter exits said first side of said grid as radiant energy.

7. The apparatus according to claim 1, further comprising a gas-fired burner for emitting energy, wherein said emitter is positioned between said burner and said grid for absorbing at least some of the energy emitted from said burner.

8. The apparatus according to claim 1, wherein:
said emitting side of said emitter is planar, and
said grid includes members that define said second side of said grid and extend perpendicularly away from said emitting side of said emitter.

9. The apparatus according to claim 1, wherein said emitter's emitting side is a substantially solid surface in that said emitter's emitting side substantially does not include any openings that extend through said emitter's emitting side in a manner that would allow air to flow through said emitter's emitting side.

10. The apparatus according to claim 1, wherein at least a substantial portion of said second side of said grid is no more than about 0.15 inches from said emitting side of said emitter.

11. The apparatus according to claim 1, wherein:
said grid includes first and second longitudinal members;
said first and second longitudinal members are adjacent to one another and in opposing face-to-face relation with one another so that a cavity of said plurality of cavities is defined between said first and second longitudinal members;
said cavity defined between said first and second longitudinal members is upwardly open and has a bottom; and
at said central area of said grid, said emitter obstructs said bottom of said cavity defined between said first and second longitudinal members, comprising said grid being in substantially close proximity to said emitter.

12. The apparatus according to claim 1, wherein for each cavity of said plurality of cavities, infrared radiation emitted from said emitting side of said emitter propagates vertically from said emitting side of said emitter to and through an upper opening of said cavity.

13. An apparatus for cooking food with infrared radiation, the apparatus comprising:
at least one infrared energy emitter for emitting at least the infrared radiation, said emitter having an emissivity of at least about 0.5;
at least one grid mounted for having a first side of said grid support the food at a position so that at least some of the infrared radiation will cook the food, wherein
said grid has a second side that is opposite from said first side and is positioned between said first side and said emitter's emitting side, and
at a central area of said grid, said second side of said grid is in substantially close proximity to said emitting side of said emitter for substantially restricting any airflow in any space between said second side of said grid and said emitting side of said emitter; and
a source of energy, wherein
said emitter has a receiving side that is opposite from said emitting side, said receiving side is for receiving the energy from said source of energy, and said emitting side is for emitting the infrared radiation in response to said receiving side receiving the energy from said source of energy,
said grid comprises a plurality of partitions for supporting the food, and
at a central area of said plurality of partitions, said plurality of partitions are in a predetermined configuration and adjacent to said emitting side of said emitter so that at least
  (a) said emitting side of said emitter is operatively segregated into a plurality of segments,
  (b) partitions of said plurality of partitions and segments of said plurality of segments respectively cooperatively define a plurality of cavities,
  (c) each cavity of said plurality of cavities includes
    (1) an inner portion that is at least partially defined by a respective segment of said plurality of segments, and
    (2) an outer opening that is farther from said emitting side of said emitter than said inner portion of said cavity and is defined by one or more partitions of said plurality of partitions, and
  (d) for each cavity of said plurality of cavities, substantially all energy emitted from said segment that at least partially defines said inner portion of said cavity exits said outer opening of said cavity as radiant energy.

14. The apparatus according to claim 13, wherein said emitting side of said emitter is at least a substantially solid surface.

15. The apparatus according to claim 13, wherein at least one cavity of said plurality of cavities is an elongate, open channel that extends parallel to said emitting side of said emitter.

16. The apparatus according to claim 13, wherein for each partition of said plurality of partitions and a respective cavity of said plurality of cavities:
said partition includes at least a first edge that is in substantially close proximity to said emitting side of said emitter and at least partially defines said inner portion of said cavity,
said partition further includes at least a second edge that is farther from said emitting side of said emitter than said first edge and at least partially defines said outer opening of said cavity, and
a distance that is perpendicular to said emitting side, and is measured between said first edge and said second edge, is at least about 1 inch.

17. The apparatus according to claim 13, wherein for each partition of said plurality of partitions and a respective cavity of said plurality of cavities:
said partition includes at least a first edge that is in substantially close proximity to said emitting side of said emitter and at least partially defines said inner portion of said cavity,
said partition further includes at least a second edge that is farther from said emitting side of said emitter than said first edge and at least partially defines said outer opening of said cavity, and
a distance that is perpendicular to said emitting side, and is measured between said emitting side and said second edge, is less than about 1.5 inches.

18. The apparatus according to claim 13, wherein for each partition of said plurality of partitions and a respective cavity of said plurality of cavities:
said partition includes at least one edge that is in opposing face-to-face contact with said emitting side of said emitter, and
said edge at least partially defines said inner portion of said cavity.

19. The apparatus according to claim 13, wherein said partitions extend at least substantially perpendicular to said emitting side of said emitter.

20. The apparatus according to claim 13, wherein said source of energy comprises at least one gas-fired burner that is operatively associated with said receiving side of said emitter for supplying energy to said receiving side.

21. The apparatus according to claim 13, wherein for at least one cavity of said plurality of cavities, said inner portion of said cavity includes at least one downwardly open opening.

22. The apparatus according to claim 13, wherein said plurality of partitions being in the predetermined configuration and adjacent to said emitting side of said emitter is further operative so that a substantially uniform distribution of infrared radiation is provided in an area of at least about a square foot that is in close proximity over said plurality of partitions.

23. The apparatus according to claim 22, wherein for said at least one cavity of said plurality of cavities, said cavity extends across an edge of said emitting side of said emitter so that said downwardly open opening is at least partially defined by said edge for allowing residue to escape from said cavity.

24. The apparatus according to claim 13, wherein:
said emitting side of said emitter is planar, and
said partitions extend perpendicularly away from said emitting side of said emitter.

25. An apparatus for cooking food with infrared radiation, the apparatus comprising:
at least one infrared energy emitter for emitting at least the infrared radiation, said emitter having an emissivity of at least about 0.5; and
at least one grid mounted for having a first side of said grid support the food at a position so that at least some of the infrared radiation will cook the food, wherein
said grid has a second side that is opposite from said first side and is positioned between said first side and said emitter's emitting side,
at a central area of said grid, said second side of said grid is in substantially close proximity to said emitting side of said emitter for substantially restricting any airflow in any space between said second side of said grid and said emitting side of said emitter,
said grid comprises a plurality of longitudinal members for supporting the food,
said plurality of longitudinal members and said emitting side of said emitter cooperatively define a plurality of upwardly open chambers, and
at a central area of said plurality of longitudinal members, said plurality of longitudinal members are arranged in a predetermined configuration and are adjacent to said emitting side of said emitter so that at least
  (a) said emitting side of said emitter is operatively segregated into a plurality of segments,
  (b) each open chamber of said plurality of open chambers includes
    (1) an inner portion that is at least partially defined by a respective segment of said plurality of segments, and
    (2) an outer opening that is farther from said emitting side of said emitter than said inner portion, and
  (c) for each open chamber of said plurality of open chambers, substantially all energy emitted from said segment that at least partially defines said inner portion of said open chamber exits said outer opening of said open chamber as radiant energy.

26. The apparatus according to claim 25, wherein said emitting side of said emitter is at least a substantially solid surface.

27. The apparatus according to claim 25, wherein at least one open chamber of said plurality of open chambers is an elongate, open channel that extends parallel to said emitting side of said emitter.

28. The apparatus according to claim 25, wherein for each open chamber of said plurality of open chambers, a distance that is perpendicular to said emitting side, and is measured between said inner portion and said outer opening, is at least about 1 inch.

29. The apparatus according to claim 25, wherein for each open chamber of said plurality of open chambers, a distance that is perpendicular to said emitting side, and is measured between said emitting side and said outer opening, is less than about 1.5 inches.

30. The apparatus according to claim 25 in combination with a source of energy, wherein:
said source of energy is operatively associated with said emitter for supplying energy to emitter, and
said emitter is operatively associated with said source of energy for emitting the infrared radiation in response to receiving the energy from said source of energy.

31. The apparatus according to claim 25, wherein for at least one open chamber of said plurality of open chambers, said inner portion of said open chamber includes at least one downwardly open opening.

32. An apparatus for cooking food with infrared radiation, the apparatus comprising:
at least one infrared energy emitter for emitting at least the infrared radiation, said emitter having an emissivity of at least about 0.5; and
at least one grid mounted for having a first side of said grid support the food at a position so that at least some of the infrared radiation will cook the food, wherein
said grid has a second side that is opposite from said first side and is positioned between said first side and said emitter's emitting side,
at a central area of said grid, said second side of said grid is in substantially close proximity to said emitting side of said emitter for substantially restricting any airflow in any space between said second side of said grid and said emitting side of said emitter,
said grid includes first and second longitudinal members,
said first and second longitudinal members are adjacent to one another and in opposing face-to-face relation with one another so that a cavity is defined between said first and second longitudinal members,
said cavity is upwardly open,
said cavity has a bottom, and
at a central area of said grid, said bottom of said cavity is partially obstructed by said emitter, comprising
  said grid being in substantially close proximity to said emitter, and
  a portion of said bottom of said cavity being downwardly open.

33. The apparatus according to claim 32, wherein said portion of said bottom of said cavity being downwardly open comprises there being an opening at said bottom of said cavity, and said opening comprises an edge of said emitter.

34. The apparatus according to claim 32, wherein said second side of said grid is in contact with said emitter.

35. The apparatus according to claim 34, wherein for said at least one open chamber of said plurality of open chambers, said open chamber extends across an edge of said emitting side of said emitter so that said downwardly open opening is at least partially defined by said edge for allowing residue to escape from said open chamber.

36. The apparatus according to claim 32, wherein said emitter partially obstructing said bottom of said cavity comprises said emitter substantially closing said bottom of said cavity.

37. The apparatus according to claim 32, further comprising a gas-fired burner for providing energy, wherein said emitter is positioned between said burner and said grid for absorbing at least some of the energy from said burner.

38. An apparatus for cooking food with infrared radiation, the apparatus comprising:
- at least one infrared energy emitter for emitting at least the infrared radiation, said emitter having an emissivity of at least about 0.5; and
- at least one grid mounted for having a first side of said grid support the food at a position so that at least some of the infrared radiation will cook the food, wherein
- said grid has a second side that is opposite from said first side and is positioned between said first side and said emitter's emitting side,
- at a central area of said grid, said second side of said grid is in substantially close proximity to said emitting side of said emitter for substantially restricting any airflow in any space between said second side of said grid and said emitting side of said emitter,
- said grid includes first and second longitudinal members,
- said first and second longitudinal members are adjacent to one another and in opposing face-to-face relation with one another so that a cavity is defined between said first and second longitudinal members,
- said cavity is upwardly open and has a bottom, and
- at a central area of said grid, said emitter obstructs said bottom of said cavity, comprising said grid being in substantially close proximity to said emitter.

39. The apparatus according to claim 38, wherein said second side of said grid is in contact with said emitter.

40. The apparatus according to claim 38, wherein said emitter obstructing said bottom of said cavity comprises said emitter only partially obstructing said bottom of said cavity so that a portion of said bottom of said cavity is downwardly open.

41. The apparatus according to claim 38, wherein said emitter obstructing said bottom of said cavity comprises said emitter substantially closing said bottom of said cavity.

42. The apparatus according to claim 38, further comprising a gas-fired burner for providing energy, wherein said emitter is positioned between said burner and said grid for absorbing at least some of the energy from said burner.

43. The apparatus according to claim 38, wherein at least a substantial portion of said second side of said grid is no more than about 0.25 inches from said emitting side of said emitter.

44. An apparatus for cooking food with infrared radiation, the apparatus comprising:
- a gas-fired burner for emitting energy;
- a plurality of emitting segments having an emissivity of at least about 0.5, and positioned above said gas-fired burner
    - for absorbing at least some of the energy emitted from said burner, and
    - for emitting at least the infrared radiation in response to absorbing at least some of the energy emitted from said burner;
- a plurality of grid members, wherein at least at a central area of said plurality of grid members, said plurality of grid members are respectively contiguous with and extend upwardly from said plurality of emitting segments for supporting the food at a position that is above said plurality of emitting segments; and
- said plurality of grid members being configured so that
    - a plurality of cavities are respectively positioned between adjacent grid members of said plurality of grid members, and
    - for each cavity of said plurality of cavities, said cavity is configured for allowing infrared radiation emitted from a respective emitting segment of said plurality of emitting segments to pass upwardly, through and out of said cavity for cooking the food, comprising
        - a lower end of said cavity being at least partially defined by said respective emitting segment,
        - said cavity extending upwardly away from said respective emitting segment, and
        - said cavity being upwardly open.

45. The apparatus according to claim 44, wherein said plurality of emitting segments have an emissivity of greater than about 0.85.

46. The apparatus according to claim 44, wherein for at least one cavity of said plurality of cavities, said lower end of said cavity includes at least one downwardly open opening.

47. The apparatus according to claim 44, wherein for each cavity of said plurality of cavities, said cavity is configured for allowing infrared radiation to propagate vertically from the respective emitting segment through an upper opening of said cavity.

* * * * *